(12) United States Patent
Hashiguchi

(10) Patent No.: US 6,753,949 B2
(45) Date of Patent: Jun. 22, 2004

(54) HEAT DEVELOPING APPARATUS HAVING ROTATING BODY PAIRS THAT CHANGE THE CONVEYING DIRECTION OF A HEAT DEVELOPING SHEET

(75) Inventor: Akihiro Hashiguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/067,294

(22) Filed: Feb. 7, 2002

(65) Prior Publication Data

US 2002/0105630 A1 Aug. 8, 2002

(30) Foreign Application Priority Data

Feb. 8, 2001 (JP) .................................... P2001-032468

(51) Int. Cl.⁷ ..................... G03B 27/00; G03B 27/32; G03G 15/20
(52) U.S. Cl. ..................... 355/405; 355/27; 399/335
(58) Field of Search ............ 355/405, 27; 399/119, 399/252, 355, 357, 338; 396/575

(56) References Cited

U.S. PATENT DOCUMENTS 3,288,047 A    11/1966    Limberger
5,750,260 A    5/1998    Ryther
5,869,807 A    2/1999    Struble et al.
5,893,003 A  * 4/1999    Allen .......................... 396/575
6,320,642 B1    11/2001    Ogawa et al.

FOREIGN PATENT DOCUMENTS

| EP | 0 841 184 A1 | 5/1998 |
| JP | 2000-122257 | 4/2000 |
| JP | 2000-241928 | 9/2000 |
| JP | 2000-330252 | 11/2000 |

* cited by examiner

Primary Examiner—Peter B. Kim
(74) Attorney, Agent, or Firm—Sughrue Mion, PLLC

(57) ABSTRACT

In the heat developing apparatus to heat the heat developing sheet A on which the latent image by the exposure is formed, to the developing temperature through the preliminary heating means I, the rotating body pairs are arranged so that the preliminary developing means I has a plurality of rotating body pairs $1a$-$1d$, $2a$-$2d$, which nip the heat developing sheet A and heat to the developing temperature and convey it, and by at least one pair of rotating body pair in the plurality of rotating body pairs, the conveying direction of the heat developing sheet is changed.

8 Claims, 7 Drawing Sheets

HEAT DEVELOPING APPARATUS HAVING ROTATING BODY PAIRS THAT CHANGE THE CONVEYING DIRECTION OF A HEAT DEVELOPING SHEET

BACKGROUND OF THE INVENTION

1. Field of the Invention

The present invention relates to a heat processing apparatus to conduct heat processing on a heat processed sheet, and particularly to the preliminary heating in the heat developing apparatus using a dry material for which the wet processing is not necessary.

2. Description of the Related Art

For example, in a plate making image recording apparatus photoengraving for printing, or a digital radiography system using a heat accumulating fluorescent substance sheet, image recording apparatus for recording a medical image such as CT, or MR (Magnetic Resonance), a wet system in which, after photographing or recording in silver halide photographing photosensitive material, an image is obtained by wet processing, is used.

In contrast to that, recently, a recording apparatus by a dry system in which the wet processing is not necessary, is remarked. In such the recording apparatus, a photosensitive and/or heat sensitive recording material (photosensitive heat sensitive recording material) or film of heat developing photosensitive material (hereinafter, called recording material) is used. Further, in the recording apparatus by this dry system, in an exposure section, laser beams are irradiated (scanning) on the recording material and a latent image is formed, and in the heat developing section, the recording material is brought into contact with a heating means for heat developing, and the recording material on which the image is formed, is delivered to the outside of the apparatus.

Such the dry system, not only the image can be formed in a shorter time as compared to the wet processing, but a problem of waste solution processing in the wet processing can also be solved, thereby, it is fully presumed that its demand is increased after now.

In this connection, in a preliminary heating in the heat developing apparatus, when the heat developing sheet whose dimension in the width direction is narrow, or the heat developing sheet whose thickness is large and stiffness is high, is heated from the room temperature to the developing temperature, a wrinkle is hardly generated even by the heating, accordingly, the counter measure for the wrinkle is not necessary, however, when the heat developing sheet whose dimension in the width direction is wide, or the heat developing sheet whose thickness is small (hereinafter, called "sheet"), is heated from the room temperature to the developing temperature, the processing quality deterioration due to the wrinkle by the expansion and contraction of the sheet by the heating is generated. In order to control the processing quality deterioration, conventionally, the following countermeasures are taken.

1) One of them is that, when the temperature of each of the rotating bodies is individually set so that a plurality of rotating body pairs are nipping the sheet and it can be heated and conveyed in stages, the generation of wrinkles in the sheet can be suppressed. Because the plurality of rotating bodies nip the sheet, principally, the buckling deformation due to the heat expansion and contraction of the sheet occurs, and sometimes wrinkles are generated. These wrinkles deteriorate the processing quality. Accordingly, in order to increase the quality, further addition of plural stages of heat rotating body pairs is necessary, which results in the increase of the number of mechanical parts and the increase of the apparatus size.

2) Another one is that, when the rotating bodies are arranged in zigzag, the sheet is not nipped by the rotating bodies, and heated and conveyed, thereby, the buckling deformation is hardly generated, and the sheet is heated and conveyed. However, there is sometimes a case in which, due to the initially existing curl of the sheet itself and the difference of the values of physical properties (friction coefficient, coking property) of the front and rear surfaces of the sheet, from the viewpoint of the conveyance property, the reliability is lowered.

SUMMARY OF THE INVENTION

Nowadays, a completely dry heat developing apparatus for the common commercial printing is developed on the base of the heat developing apparatus developed for the news paper company in initial times, however, a largely different point from the news paper field is that, in the common commercial printing field, the size of the latent image formed in the heat developing sheet becomes fine, and becomes sensitive to the dispersion of the development temperature and the development time, and that is, a point in which the processing quality deterioration due to the wrinkle is emphasized. Further, the more increase of the processing quality is required. Further, in the common commercial printing field, the WET processor is already supplied to the market at low cost, and it is required to avoid the cost-up due to the increase of the number of mechanical parts to increase the processing quality or the increase of the size of the apparatus, and on the contrary, inversely, the large reduction of the cost from the present cost is required.

Accordingly, the problem to be solved by the present invention is to provide a heat developing apparatus provided with an effective heat conveying section by which, without lowering the sheet conveying performance, while the processing quality is increased, the cost can be reduced. Further, another problem to be solved by the present invention is, as described above, while the processing quality is being increased, to improve the processing quality deterioration of a sheet leading edge portion caused by the difference of the behavior between the sheet leading edge portion and the other portion in the time of the sheet heat conveying.

In order to solve the above described problems, the heat developing apparatus according to the first aspect of the invention is characterized in that, in the heat developing apparatus to heat the heat developing sheet on which a latent image is formed by the exposure, to the developing temperature through a preliminary heating means, the preliminary heating means has a plurality of rotating body pairs to nip the heat developing sheet and to heat convey to the developing temperature, and the rotating body pairs are arranged so that at least one pair of rotating body pair in the plurality of rotating body pairs changes the conveying direction of the heat developing sheet.

The second aspect of the invention is the heat developing apparatus characterized in that, in the heat developing apparatus to heat the heat developing sheet on which a latent image is formed by the exposure, to the developing temperature through a preliminary heating means, the preliminary heating means has a plurality of rotating body pairs to nip the heat developing sheet and to heat convey to the developing temperature, and the rotating body pairs are arranged so that at least one pair of rotating body pair in the plurality of rotating body pairs changes the conveying direction of the heat developing sheet, and further, after the heat developing sheet is brought into contact from the tangential line direction of the point on the outer periphery of one rotating body constituting the rotating body pairs, the heat developing sheet is nipped.

The third aspect of the invention is, in the heat developing apparatus of the first aspect or the second aspect, characterized in that respective changes of the heat developing sheet conveying direction on the plurality of rotating body pairs are the same rotating direction around one rotating body axis center respectively arranged in the same manner in respective rotating body pairs.

The fourth aspect of the invention is, in the heat developing apparatus of any one aspect of the first aspect to the third aspect, characterized in that each of the plurality of rotating body pairs are structured by two rollers, and at least one roller is a heating roller provided with the heating means, and the arrangement, interval and temperature of the heating roller is set so that it has the temperature difference by which the heat developing processing quality deterioration due to the heat deformation of the heat developing sheet is not generated.

The fifth aspect of the invention is, in the heat developing apparatus of the fourth aspect, characterized in that the heating roller has the thick-wall metallic pipe and the heat source section arranged in the axis center of the metallic pipe, and a plurality of members whose heat conductivity is greater than the metallic pipe are buried at equal interval in the peripheral direction of the wall-thickness portion of the metallic pipe.

The sixth aspect of the invention is, in the heat developing apparatus of any one of the first aspects to the fifth aspect, characterized in that the rotating body surface material of the plurality of rotating body pairs in contact with the surface on which the latent image of the heat developing sheet is formed, is formed of silicon, and the heat developing sheet is deformed and conveyed in the same rotating direction around the axis center of the rotating body whose surface is structured by the silicon rubber.

The seventh aspect of the invention is, in the heat developing apparatus of any one of the first aspect to the sixth aspect, characterized in that the rotating body pair nips the heat developing sheet by the self weight load of the rotating body, and the rotating body arranged above the rotating body pair can be moved to the surface direction connecting the axis center of the rotating body pair.

As described above, according to the present invention, because a plurality of rotating body pairs to nip the sheet to heat-convey it up to the developing temperature are arranged in a manner that the sheet can be conveyed while the rotating direction is being changed along the outer periphery of one portion, and also in a manner that the temperature of each rotating body can be individually set so that the sheet temperature can be heated in stages by each rotating body pair, the sheet is conveyed under curved condition, and the cost of this system can be reduced while the conveyance performance is not lowered, and the processing quality is increased.

Further, as described above, while the processing quality is increased, according to the invention of the second aspect, the processing quality deterioration of the sheet leading edge portion caused by the difference of the behavior between the sheet leading edge portion and the other portion at the time of the sheet heat conveying can be improved.

DESCRIPTION OF THE PREFERRED EMBODIMENTS

Figure 4:
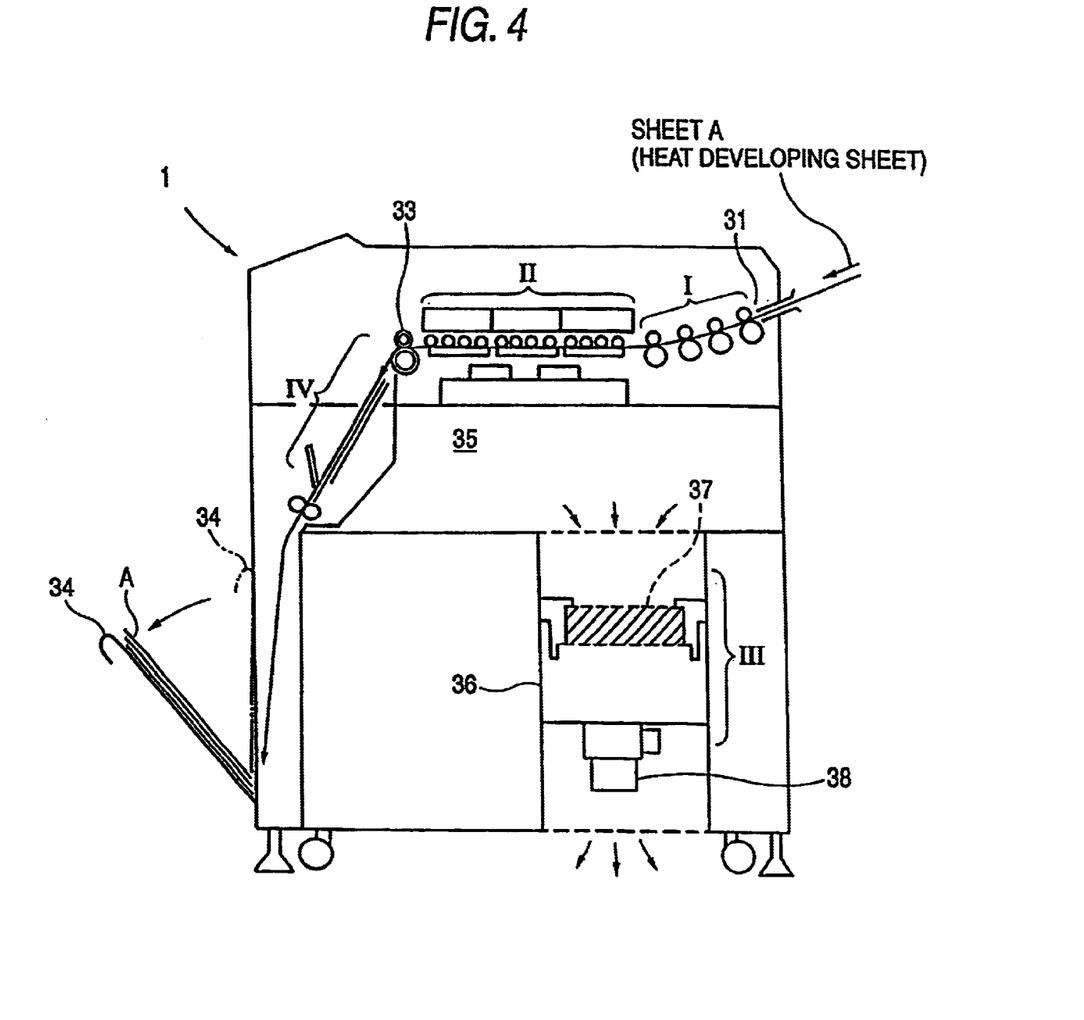
FIG. 4 shows a schematic structural view of a heat developing apparatus provide with the preliminary heating section of the object of the present invention.

FIG. 4 is a schematic structural view of a heat developing apparatus provided with a preliminary heating section which is a subject of the present invention.

This heat developing apparatus 1 heats the sheet A, and as this sheet A, for example, a plate-making recording material whose size in the width direction is large, and the thickness is thin, and specifically, as described in specification P2000-241928A applied by the present applicant, the heat developing photosensitive material which is characterized in that it has an image forming layer including at least (a) non-photosensitive organic silver salt, (b) photosensitive silver halide, (c) reduction agent, and (d) nucleating agent, on a substrate, and a portion not smaller than 50 weight % of the binder of the image forming layer is formed by using the latex of the polymer whose glass transition temperature not lower than −30° C. and not higher than 40° C., and after the image forming layer is coated on the substrate and dried, the film surface temperature is not smaller than 30° C. and not larger than 70° C., and the heating processing is conducted at the temperature not larger than the glass transition temperature of the substrate, can be listed.

The heat developing apparatus 1 is provided with a preliminary heating section I, developing section II, exhaust section III, and slow cooling section IV, as a main structure.

The sheet A is supplied from a sheet supply port 31 of the heat developing apparatus 1, and initially, passes through a preliminary heating section I. The preliminary heating section I is a section which preliminarily heats the sheet A and raises the temperature to the heat developing temperature, and is structured by a plurality pairs of nip rollers which are heat rollers. The subject of the present invention is this preliminary heating section I, and this will be described later.

The sheet A whose temperature is risen to the heat developing temperature by the preliminary heating section I is successively conveyed to the developing section II. In the developing section II according to the present embodiment, the following heater unit is arranged. That is, this heater unit is composed of an aluminium sheet metal of the lower side arrangement, which is flock-processed by a flock material 6 nylon, a heater, a portion of which is surrounded by this aluminium sheet plate, and an iron (SECC) sheet metal as an auxiliary heating body of the upper side arrangement which is flock-processed by a flock material 6 nylon in the same manner, the sheet A entered into this heater unit is passed through between the aluminium sheet metal of the lower side, and the iron sheet metal of the upper side, while being heated by the heater, and at the time, the sheet is moved slidingly on the tactile hair, without pressing it. Gas generated from the preliminary heating section I, developing section II, is sucked from a chamber section 35 into the exhaust path 36, and passes through a deodorant filter 37 to be cleaned, and then, discharged to the outside of the apparatus by an exhaust fan 38.

On the downstream side of the sheet conveying direction of the developing section II, the cooling section IV is arranged, and after the sheet A is heat developing processed in the developing section II, it is conveyed to the cooling section IV by a nip roller 33, and cooled. In this manner, the sheet A on which the heat developing is completed, is delivered from the exit, and is stacked on a film receiving tray 34 provided outside the apparatus.

Figure 1:
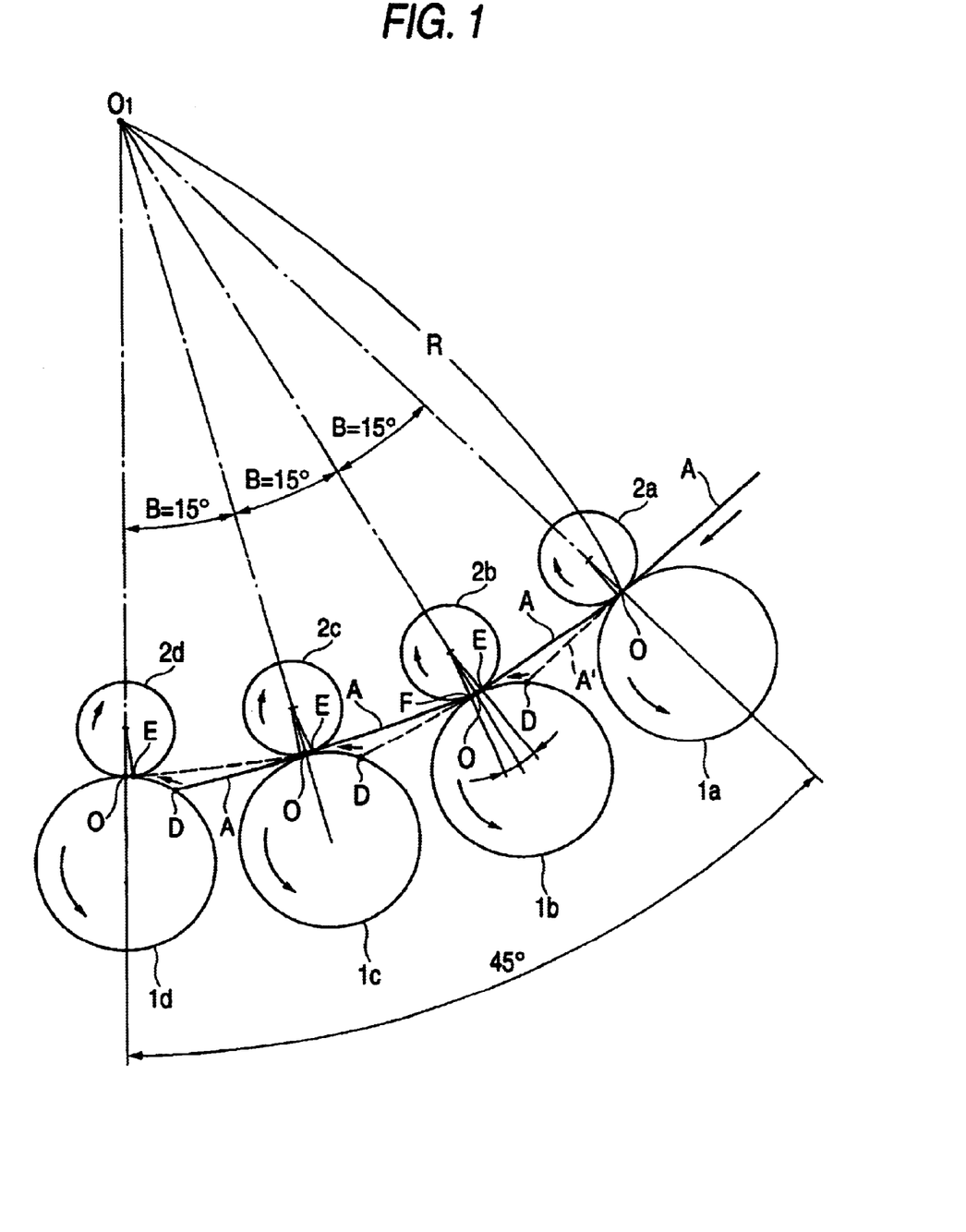
FIG. 1 is a view showing a roller arrangement of a preliminary heating section of the first embodiment of the present invention.

The roller arrangement of the preliminary heating section which is the first embodiment of the present invention is shown in FIG. 1. In FIG. 1, a group of 1a through 1d is heating rollers which are a drive section, and a group of 2a-through 2d is conveying rollers which are a driven section, and A is a heat developing sheet on which a latent image by the exposure is formed. This sheet A is finally heated to the developing temperature in the developing section through this preliminary heating means.

In FIG. 1, four rotating body pairs are arranged so that each nip point O of four rotating body pairs (1a-2a, 1b-2b, 1c-1c, 1d-2d) is on the same curvature line of the radius R whose central point is a position of $O_1$, and an angle B formed by the straight line which connects nip points of the adjoining rotating body pairs to the center of curvature O1 becomes the same to each other (in the drawing, B=15°).

In the four rotating body pairs which form the curved surface, the conveyance rollers 2a through 2d are arranged inside and the heating rollers 1a through 1d are arranged outside, and each of heating rollers 1a-through 1d is set so that the heating temperature is gradually increased in this order. At that, the temperature difference between the individual heating rollers 1a through 1d is changed gradually in order to suppress processing quality deterioration due to wrinkle generation in the sheet A. Corresponding to the temperature change, the arrangement and interval of the heating rollers 1a through 1d are respectively set.

The heating rollers 1a through 1d respectively have, although not shown, a thick wall metallic pipe, and a heat source section arranged at the axis center of the metallic pipe, and a plurality of members whose heat conductivity is not smaller than the metallic pipe, are buried at an equal interval in the peripheral direction of the thick wall portion of the metallic pipe.

The surface material of the rotating body of the conveying rollers 2a through 2d is formed of silicon rubber.

Further, the rotating body pairs (1a-2a, 1b-2b, 1c-2c, 1d-2d) nip the sheet A by the self weight load of the rotating bodies 2a-through 2d, and when the rotating bodies (conveying rollers) 2a-through 2d, arranged above the rotating body pairs can be moved in the direction of the surface connecting the axis center of the rotating body pairs, the rotating body pairs of the object can be obtained by a simple structure and at a low cost.

When the sheet A is inserted from its tangential line direction into the nip point O between the heating roller 1a and the conveying roller 2a of such the arrangement, the leading edge of the sheet A is nipped by the heating roller 1a and the conveying roller 2a, and heated while being conveyed. The leading edge of the sheet A conveyed from the heating roller 1a and the conveying roller 2a is, as shown by the dotted line, advances to the tangential direction of its nip point O and comes into contact with a point D on the heating roller 1b of the adjoining rotating body pair b. As shown in FIG. 1, because the heating roller 1a is rotated in the counterclockwise direction, the sheet A which came into contact with the point D, is conveyed in the arrowed (counterclockwise) direction by the heating roller 1b, and after the sheet comes into contact with a point E (contact point of the tangential line of the conveying rollers 2a and 2b), the leading edge advances while following about the conveying roller 2b, and then enters into the nip point O, and is nipped by the heating roller 1b and the conveying roller 2b, and is conveyed while being heated.

Then, the next following sheet A after the leading edge of the sheet A passes through the final roller pair 1d-2d, is heated through the path of step 1: the insertion port, step 2: it is brought into contact with the conveying roller 2a at the nip portion between the conveying roller 2a and the heating roller 1a, step 3: it is separated at F of the conveying roller 2a, step 4: comes into contact with E of the conveying roller 2b, step 5: it is separated from f of the conveying roller 2b, step 6: it comes into contact with E of the conveying roller 2c, step 6: it is separated at F of the conveying roller 2b, step 7: it comes into contact with E of the conveying roller 2c, step 8: it is separated at F of the conveying roller 2c, and step 9: it comes into contact with E of the conveying roller 2d.

As described above, the sheet A is conveyed while its conveying direction is being changed along the conveying roller outer shape for each nip point of each rotating body pair from the insertion port. Because the sheet A has the bend deformation when it is brought into the heating roller, the buckling deformation due to the heat expansion and contraction generated in the sheet width direction (the perpendicular direction to the conveying direction) is hardly generated, that is, the wrinkle is hardly generated, and thereby, the processing quality is increased. Alternatively, so much as an amount in which the buckling deformation is hardly generated, the temperature setting value of each heating roller can be set higher, and in a degree in which the processing quality is not affected, the number of heating stages by which heating is conducted in stages to the developing temperature, can be reduced.

Figure 2:
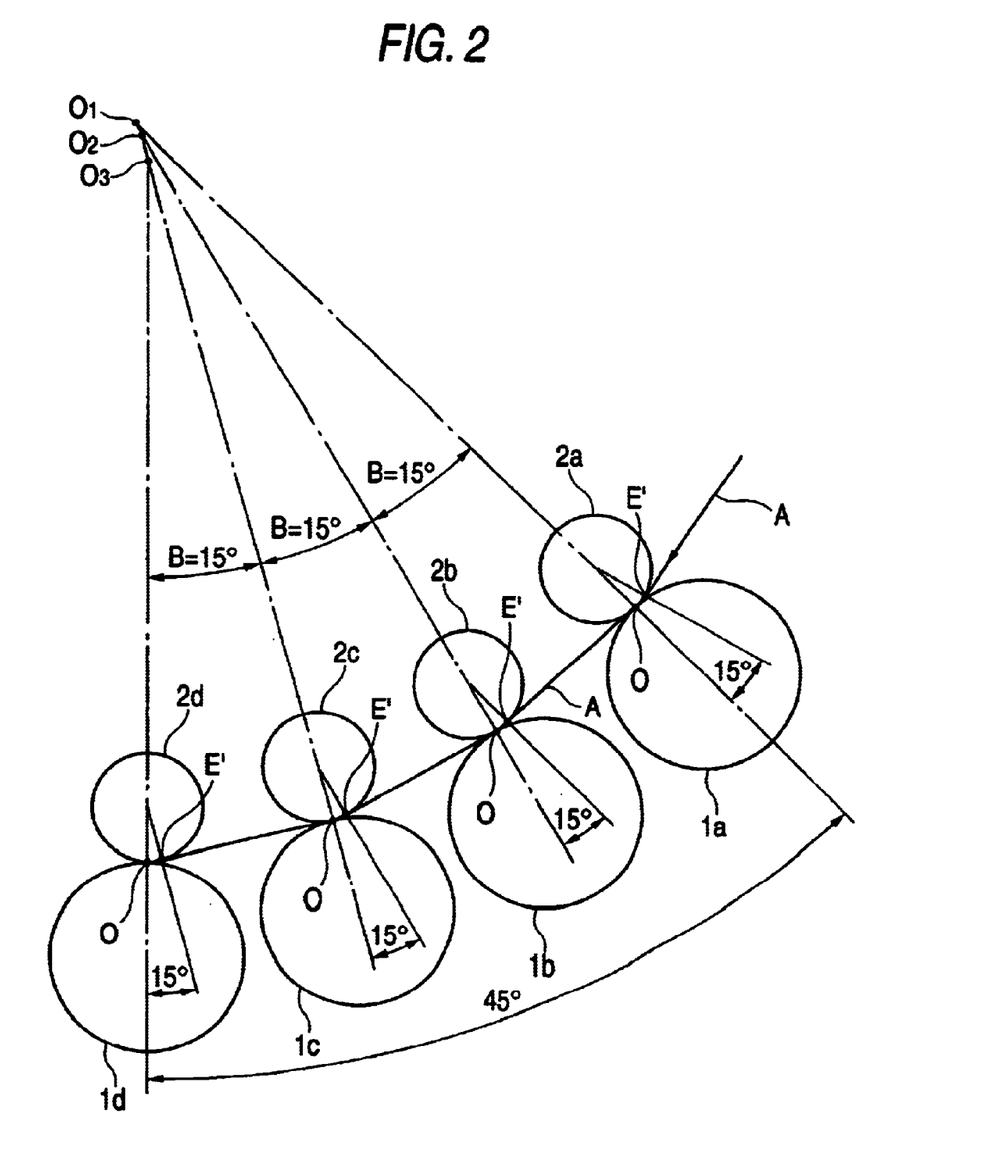
FIG. 2 is a view showing a roller arrangement of a preliminary heating section of the second embodiment of the present invention.

Next, the roller arrangement of the preliminary heating section which is the second embodiment of the present invention, is shown in FIG. 2.

In FIG. 2, reference signs 1a through 1d are heating rollers as in FIG. 1, and 2a-through 2d are conveying rollers, and A is a heat developing sheet on which a latent image is formed by the exposure, and it is heated to the developing temperature through the preliminary heating means from now.

In four rotating body pairs, the conveying rollers 2a-through 2d are respectively arranged inside, and heating rollers 1a through 1d are arranged outside, and the heating temperature of each of heating rollers 1a through 1d is set higher in this order. A temperature difference between each of the heating rollers 1a through 1d is set to suppress processing quality deterioration due to wrinkle generation in the sheet A, and corresponding to that, those arrangements and intervals between the heating rollers are respectively set.

The heating roller 1 has, although not shown, a thick wall metallic pipe, and a heat source section arranged at the axis center of the metallic pipe, and a plurality of members whose heat conductivity is not smaller than the metallic pipe, are buried at an equal interval in the peripheral direction of the thick wall portion of the metallic pipe. The surface material of the rotating body of the conveying roller 2 is formed of silicon rubber.

Further, by making the rotating body pairs nip the sheet A by the self weight load of the rotating bodies, and also by making the rotating bodies (conveying rollers) arranged above the rotating body pairs be movable in the direction of the surface connecting the axis center of the rotating body pairs, the rotating body pairs of the object can be obtained with a simple structure and at a low cost.

A point in which, after the heat developing sheet A is brought into contact from the tangential line direction E' of a point on the outer periphery of one rotating body $2a$ constituting the rotating body pair $1a$-$2a$, the sheet A is nipped, is characteristic. By such the arrangement, it can be seen that, in contrast to that the cross point of the straight lines passing both axes of each of rotating body pair 1-2 in FIG. 1, is the same point $O_1$, the cross point of the straight lines passing both axes of each of rotating body pair 1-2 in FIG. 2, is shifted like as $O_1$, $O_2$ and $O_3$.

Next, the conveying condition of the sheet A passing through each of roller pairs arranged as described above, will be described. The sheet A is inserted into the first rotating body pair $1a$-$2a$ from the arrowed direction in the drawing. At the time of insertion, the conveying direction of the sheet A coincides with the tangential direction of the point E' on the conveying roller $2a$, and the leading edge of the sheet A is brought into contact with the point E' on the conveying roller $2a$ at first, and after the sheet A is wound by a predetermined angle (in the example, 15°) along the outer shape of the conveying roller $2a$, it is nipped and heated by the rotating body pair. The sheet A passed through the nipping point O is separated from the conveying roller $2a$ and advances to the contact point E' on the conveying roller $2b$ as it is. As described above, also when the sheet A is inserted into the second rotating body pair $1b$-$2b$, the sheet A is conveyed from the tangential direction of the point E' on the conveying roller $2b$, to this rotating body pair $1b$-$2b$. Hereinafter, also the third and subsequent rotating body pairs $1c$-$2c$, $1d$-$2d$, are the same as described above.

The operational effect of the roller arrangement in FIG. 2 of the second embodiment will be described below, as compared to the first embodiment in FIG. 1.

In FIG. 1, as described above, four rotating body pairs are arranged so that each of nipping points of four rotating body pairs by which the sheet is nipped and the sheet temperature is heated to the developing temperature and the sheet is conveyed, is positioned on the same curvature line of the radius R whose central point is a position of $O_1$, and further, angles B of the straight lines connecting the nipping points of the adjoining rotating body pairs with the center of curvature $O_1$ become the same. Accordingly, because the sheet A is conveyed while its conveying direction is changed along the outer shape of the conveying roller, for each nipping point of each of rotating body pairs from the insertion port, the buckling deformation due to the heat expansion and compression generated in the sheet width direction (the perpendicular direction to the conveying direction) is hardly generated, that is, the wrinkle is hardly generated, and the processing quality is increased.

However, when each of rotating body pairs is arranged in this manner, there is sometimes a case where the processing quality deterioration becomes conspicuous depending on the performance of the sheet because the conveying behavior of the leading edge portion of the sheet is a little different from that of the subsequent portion, and the heat developing condition is a little different. The conveying behavior whose heat developing condition is a little different is, specifically speaking, for example, the sheet leading edge conveying behavior between the rotating body pairs c and d in FIG. 1 is as follows: after the leading edge is brought into contact with the point D on the heating roller $1d$, it advances to the nip portion sliding on the circumference of the heating roller $1d$. When the leading edge is brought into contact with the point D and advances slidingly to the nipping point, the behavior of the sheet in the vicinity of the back rotating body pair c is as follows: a portion in contact with the circumference of the rubber roller $2c$ becomes large. That is, the leading edge portion of the sheet from the portion nipped by the rotating body pair to the portion nipped by the back rotating body pair is a little different from the subsequent sheet in the demand and supply of the heat energy.

In contrast to this, when the rotating body pair is arranged as in FIG. 2, the portion in which the demand and supply of the heat energy is different is, when the fourth rotating body pair d is described, the outer periphery portion for 15° of the rubber roller between the contact point E' and the nipping point O, and there is no redundant movement in which the leading edge of the sheet is brought into contact with the point D and moved as in FIG. 1, and the system in FIG. 2 can be largely improved as compared to that in FIG. 1.

As described above, according to the second embodiment, because the conveying direction of the sheet A is changed along the outer shape of the conveying roller at each nipping point of each rotating body pair from the insertion port of the sheet A and the sheet A is conveyed, other than the characteristic possessed by the first embodiment in which the buckling deformation due to the heat expansion and compression generated in the sheet width direction (perpendicular direction to the conveying direction) is hardly generated, that is, the wrinkle is hardly generated, and the processing quality is increased, when this structure is adopted, the sheet leading edge area in which the behavior between the sheet leading edge portion and the subsequent portion is different, can be reduced, and an area of the image quality deterioration, generated by the developing time error or the temperature error on the sheet surface generated due to the difference of the behavior, can be reduced.

Figure 3:
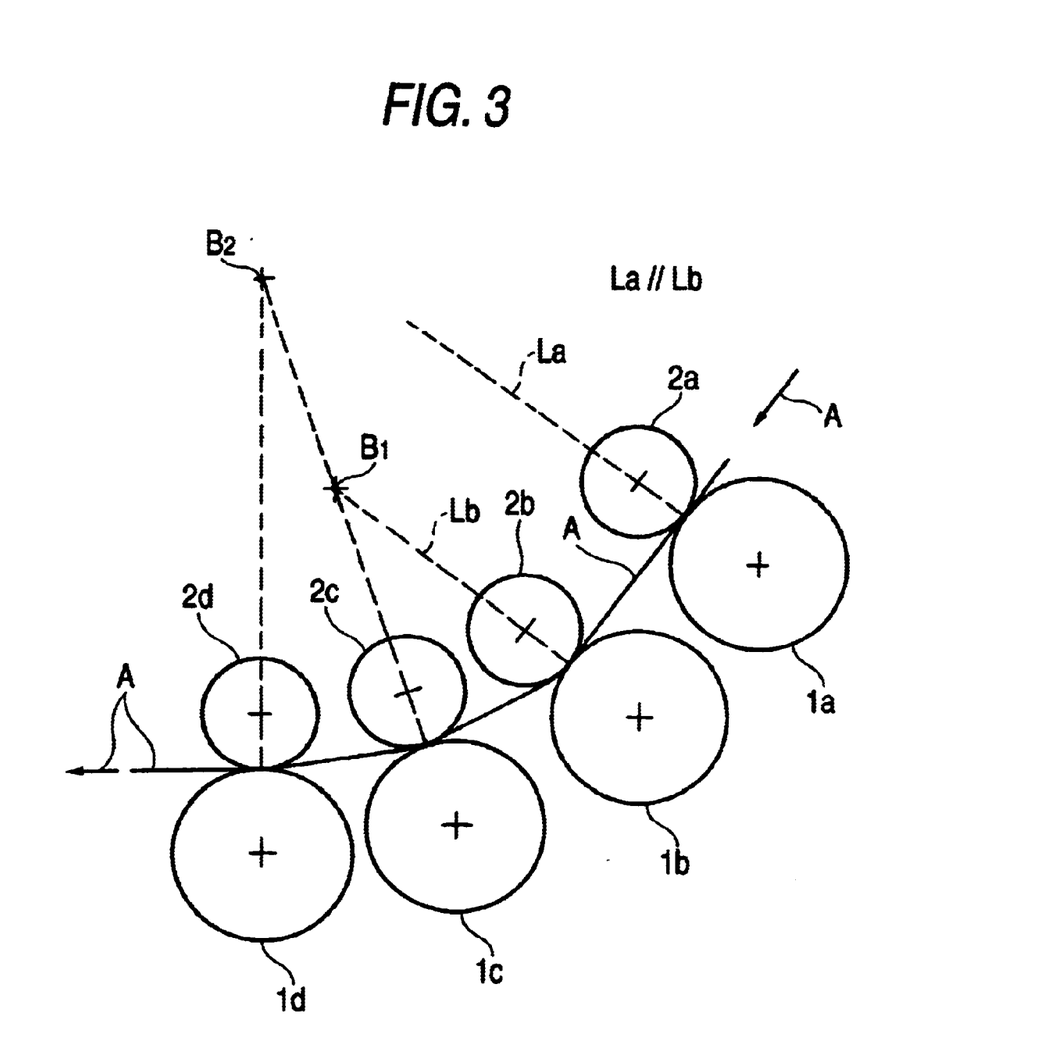
FIG. 3 is a view showing a roller arrangement of a preliminary heating section of the third embodiment of the present invention.

FIG. 3 shows the roller arrangement of the preliminary heating section showing the third embodiment of the present invention. In FIG. 3, a group $1a$-$1d$ is heating rollers which are a drive section, and a group $2a$-$2d$ is conveying rollers which are a driven section, and A is a heat developing sheet on which a latent image by the exposure is formed, and after through this preliminary heating means, this sheet A is finally heated to the developing temperature in the developing section. In FIG. 3, in 4 rotating body pairs $1a$-$1d$, $2a$-$2d$, which nip the sheet A, and by which the temperature of the sheet is heated to the developing temperature and the sheet is conveyed, the first roller pair $1a$-$2a$ and the second roller pair $1b$-$2b$ are arranged so that the straight line La connecting the both axes of the first roller pair $1a$ and $2a$, and the straight line Lb connecting both axes of the second roller pair $1b$ and $2b$ are in parallel with each other, thereby, the system is structured so that, at the time of the conveyance of the sheet A, the sheet A does not have the curl deformation.

In contrast to that, the arrangement of the rotating body pairs $1b$ and $1c$, and $1c$ and $1d$ is conducted so that, as described in the first and the second embodiment, the sheet A generates the curl deformation. Then, in this case, the rotating body pairs are arranged so that the degree of the curl deformation is different between rotating body pairs 1b and 1c (the cross point of both axes is B1), and 1c and 1d (the cross point of the both axes is B2).

In such the arrangement, (1) it is effective when it is necessary that the temperature time change curve of the sheet influenced on the processing quality makes the temperature difference in a portion of the rotating body pair large, that is, when it is necessary that the sheet deformation is made large and the strength of the sheet itself is increased. (2) It is effective when it is desired that the curvature which is owned by the sheet at the initial condition, is relieved by heating, that is, when the conveyance property is secured by eliminating the positive deformation at the initial stage of the heating.

(3) It is effective when it is desired that the restriction by the arrangement to the exposure system by which the latent image is recorded on the sheet, is removed.

Figure 5:
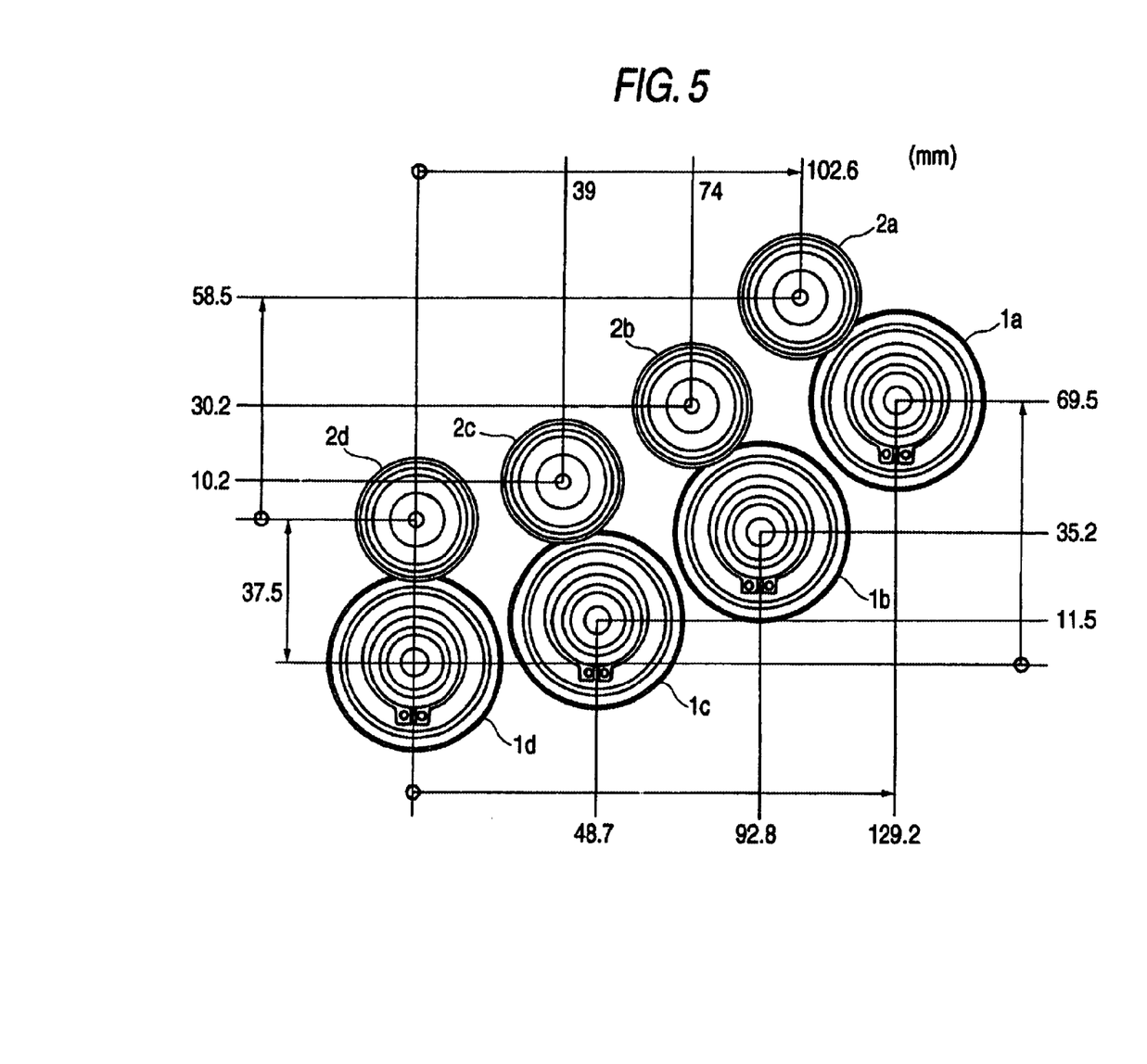
FIG. 5 is a side view showing an example of the roller arrangement according to the present invention.

FIG. 5 is a side view showing an example of the roller arrangement according to the present invention of the preliminary heating section, and the arrangement of the second embodiment is shown herein. In FIG. 5, numeral 1a through 1d is the heating rollers which is a drive section, and 2a through 2d is conveying rollers. An example of the arrangement and interval of each of heating rollers 1a through 1d and each of conveying rollers 2a through 2d are as follow.

Relating to each of heating rollers 1a through 1d, the axis of the heating roller 1d is made the center, and the axis of the heating roller 1c is arranged at a point of 48.7 mm in the lateral direction, and 11.5 mm in the upper direction, and the axis of the heating roller 1b is arranged at a point of 92.8 mm in the lateral direction and 35.2 mm in the upper direction, and the axis of the heating roller 1a is arranged at a point of 129.2 mm in the lateral direction and 69.5 mm in the upper direction.

Further, relating to each of conveying rollers 2a through 2d, the axis of the conveying roller 2d is made the center, and the axis of the conveying roller 2c is arranged at a point of 39.0 mm in the lateral direction, and 10.2 mm in the upper direction, and the axis of the conveying roller 2b is arranged at a point of 74.0 mm in the lateral direction and 30.2 mm in the upper direction, and the axis of conveying roller 2a is arranged at a point of 102.6 mm in the lateral direction and 58.5 mm in the upper direction. When these rollers are arranged at these numerical values, the arrangement of the rollers in FIG. 2 can be realized.

Figure 6:
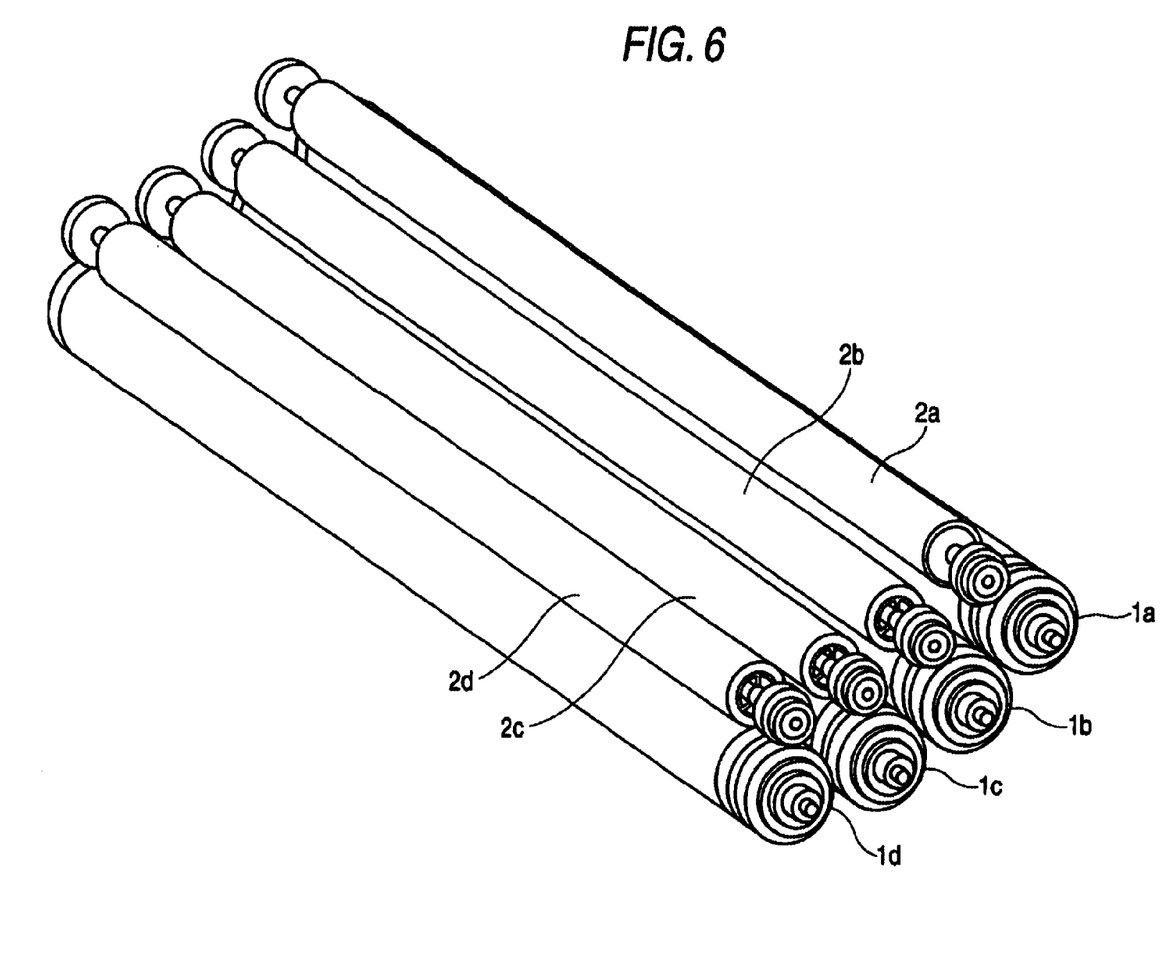
FIG. 6 is a perspective view of the roller arrangement in FIG. 5.

FIG. 6 is a perspective view of the roller arrangement in FIG. 5. In FIG. 6, numeral 1a through 1d is heating rollers which is a drive section, and 2a through 2d is conveying rollers. That is, the conveying rollers 2a through 2d are arranged inside (upper side), and heating rollers 1a through id are arranged outside (lower side).

Each heating roller 1a through 1d is composed of a wall-thick metallic pipe, and a heat source section arranged at the axial center of the metallic pipe, and a plurality of members whose heat conductivity is not smaller than that of the metallic pipe are buried at an equal interval in the peripheral direction of the wall-thick portion of the metallic pipe.

Further, in the conveying rollers 2a through 2d, the rotating body surface material is formed of silicon rubber. By making the conveying rollers 2a through 2d nip the sheet A by the self weight load of the rotating body, and also by making the conveying roller be movable in the surface direction connecting the axis center of the rotating body pair, the rotating body pair of the object can be obtained by a simple structure and at a low cost.

Figure 7:
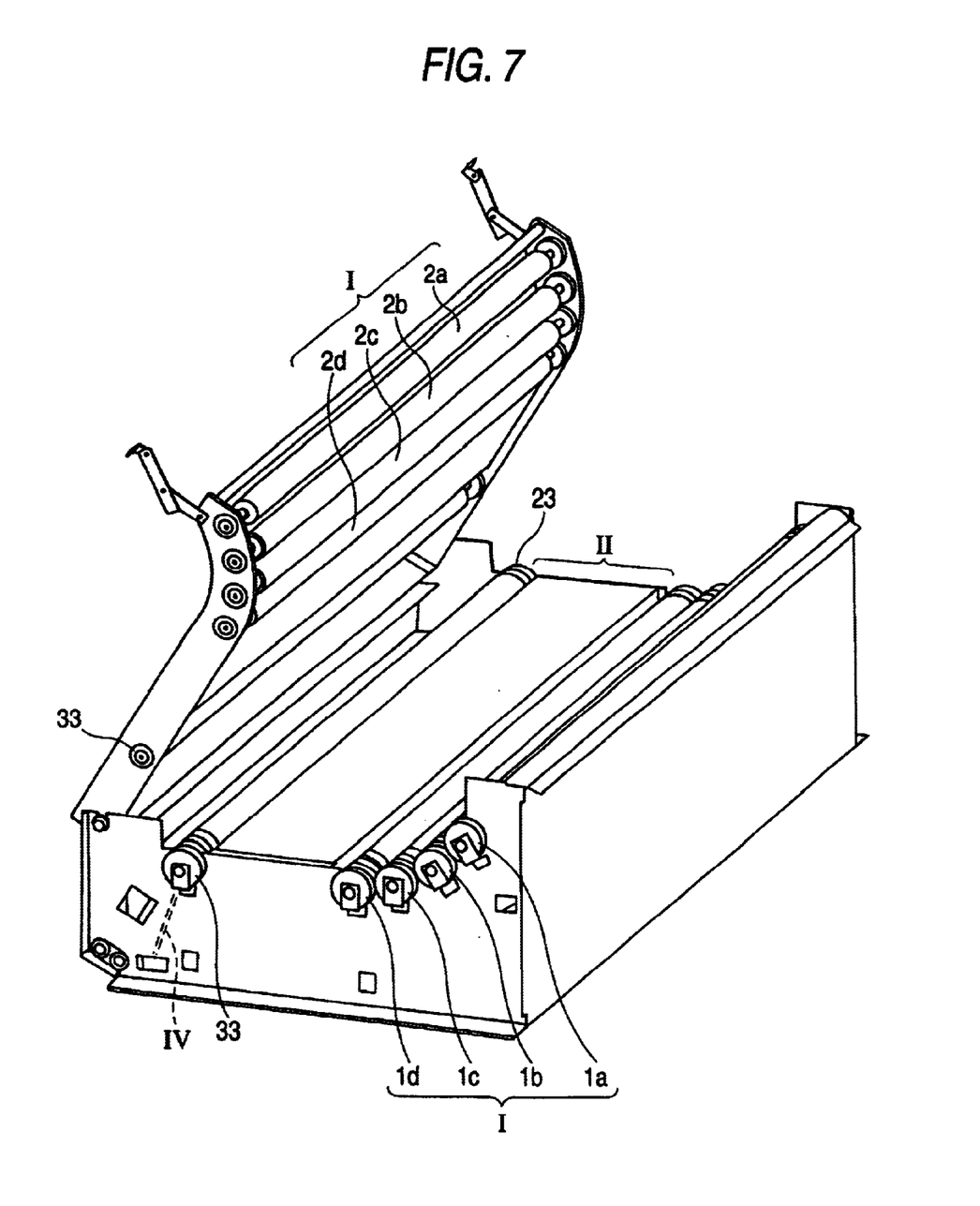
FIG. 7 is a perspective view of a main portion [heating section (the preliminary heating section I and the developing section II) and the cooling section IV] of the heat developing apparatus having the roller arrangement in FIG. 6.

FIG. 7 is a perspective view of the interior (preliminary heating section I, developing section II, cooling section IV) of the heat developing apparatus which has the roller arrangement in FIG. 6. In the view, the upper lid (conveying rollers 2a through 2d) side of the heating section is shown as an opened condition, and when the upper lid is closed, it becomes a condition as in FIG. 6. The sheet enters into the preliminary heating section I, and the sheet is preliminarily heated in the preliminary heating section, and its temperature rises to the heat developing temperature, then, the sheet is conveyed to the developing section II. In the developing section II, the sheet passes sliding on the heat plate which is the heating body, at the developing temperature. After the sheet is heat developing processed, the sheet is conveyed to the cooling section by the nip roller 33, and cooled herein, and the sheet on which the heat development is completed, is delivered from the exit, and stacked on the tray.

[Effect of the Invention]

As described above, when the structure of the present invention is adopted, the following effects can be obtained.

1) The shape of the sheet is curved along the outer shape of the rotating body pair at the nip portion of the rotating body pair, and the rigidity of the sheet itself is increased, thereby, the buckling deformation is hardly generated.

2) By the above description, the number of heating stages can be reduced lower than, or kept at least the same as the present condition, thereby, the increase of the processing quality and the reduction of the cost can be attained.

3) In rotating body pairs, because the rotation direction around the rotating body axis center respectively arranged in the same manner is the same, the nipped condition on the rotating body pair of the sheet front and rear surfaces is the same, the conveyance deterioration due to the initially existing curl of the sheet itself and the difference of the physical values (frictional coefficient, stickiness) can be easily avoided.

4) Because the contact time with the other than the atmosphere (conveying roller 2) is increased as compared to the conventional apparatus, the efficiency is increased in the heat supply to the sheet.

5) As the result of the above description, the size of the apparatus can be reduced.

6) Further, according to the second embodiment, when this apparatus is adopted, the sheet leading edge area in which the behavior of the leading edge portion of the sheet and the other portion is different from each other, can be reduced, and the area of the image quality deterioration due to the developing time error caused by the difference of the behavior or the temperature error on the sheet surface, can be reduced.

Further, according to the third embodiment, when this structure is adopted,

7) It is effective when the temperature time change curve of the sheet which influences on the processing quality, is required to increase the temperature difference on a portion of the rotating body pairs, that is, when it is necessary that the deformation of the sheet is increased and the strength of the sheet itself is increased.

8) It is effective when it is desired that the curl which the sheet has in the initial condition, is moderated by heating, that is, when the conveyance property is secured by eliminating the positive deformation in the initial stage of heating.

9) It is effective when it is desired that the restriction due to the arrangement to the exposure system by which the latent image is recorded on the sheet, is removed.

What is claimed is:

1. A heat developing apparatus in which a heat developing sheet on which a latent image is formed by the exposure, and is heated to the developing temperature through a preliminary heating section before the sheet is developed by a developing section, characterized in that:

the preliminary heating section has a plurality of rotating body pairs for nipping the heat developing sheet and for heating-conveying it to the developing temperature; and the rotating body pairs are arranged so that the conveying direction of the heat developing sheet is changed by at least one pair of rotating body pair in the plurality of rotating body pairs.

2. A heat developing apparatus in which a heat developing sheet on which a latent image is formed by the exposure and is heated to the developing temperature through a preliminary heating section before the sheet is developed by a developing section, characterized in that:

the preliminary heating section has a plurality of rotating body pairs for nipping the heat developing sheet and for heating-conveying it to the developing temperature;

the rotating body pairs are arranged so that the conveying direction of the heat developing sheet is changed by at least one pair of rotating body pair in the plurality of rotating body pairs; and after the heat developing sheet is brought into contact with one rotating body of one of the rotating pairs the from the tangential line direction of a point on an outer periphery of the one rotating body, the heat developing sheet is nipped.

3. A heat developing apparatus according to claims 1 or 2, wherein the conveying direction of the heat developing sheet is changed in the same rotating direction at nip points of each of the rotating body pairs.

4. A heat developing apparatus according to claims 1 or 2, wherein each of the plurality of rotating body pairs are structured by two rollers, and at least one roller of the two rollers is a heating roller in which the heating means is provided; and arrangement, interval and temperature of the heating rollers are set so as to have a temperature difference by which the heat developing processing quality deterioration due to the heat deformation of the heat developing sheet is not generated.

5. A heat developing apparatus according to claim 4, wherein the heating roller comprises a thick-wall metallic pipe, heat source portion arranged on the axis center of the metallic pipe, and a plurality of members whose heat conductivity is greater than the metallic pipe, are buried at an equal interval in the peripheral direction of the wall thickness portion of the metallic pipe.

6. A heat developing apparatus according to claims 1 or 2, wherein the rotating body surface material of the plurality of rotating body pairs which is brought into contact with the surface on which a material forming a latent image of the heat developing sheet is coated, is formed of silicon rubber, and the heat developing sheet is deformed and conveyed in the same rotation direction as the rotation body around the axis center of the rotating body structuring the surface by the silicon rubber.

7. A heat developing apparatus according to claims 1 or 2, wherein the rotating body pair nips the heat developing sheet by the self weight load of the rotating body, and the rotating body arranged above the rotating body pair can be moved in the surface direction in which the axis centers of the rotating body pairs are connected.

8. The heat developing apparatus of claim 3, wherein a degree of change of the conveying direction increases between a first and a second of the rotating body pairs and between the second and a third of the rotating body pairs.

* * * * *